US012111599B2

(12) United States Patent
Fukuchi et al.

(10) Patent No.: US 12,111,599 B2
(45) Date of Patent: Oct. 8, 2024

(54) IMAGE FORMING APPARATUS, IMAGE FORMING METHOD, AND NON-TRANSITORY COMPUTER-READABLE STORAGE MEDIUM STORING IMAGE FORMING PROGRAM

(71) Applicant: BROTHER KOGYO KABUSHIKI KAISHA, Nagoya (JP)

(72) Inventors: Isao Fukuchi, Gifu (JP); Akira Minami, Nagoya (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/332,679

(22) Filed: Jun. 9, 2023

(65) Prior Publication Data

US 2023/0408963 A1 Dec. 21, 2023

(51) Int. Cl.
*B41J 3/36* (2006.01)
*G03G 15/00* (2006.01)
*G03G 15/01* (2006.01)

(52) U.S. Cl.
CPC ......... *G03G 15/80* (2013.01); *G03G 15/0121* (2013.01)

(58) Field of Classification Search
CPC ..... G03G 15/0121; G03G 15/80; B41J 2/315; B41J 2/355; B41J 3/36; B41M 5/41
USPC .......................................................... 347/171
See application file for complete search history.

(56) References Cited

U.S. PATENT DOCUMENTS

2021/0141328 A1 5/2021 Sasaki et al.
2022/0203707 A1 * 6/2022 Minami .................... B41J 3/36

FOREIGN PATENT DOCUMENTS

JP 2019-214206 A 12/2019

* cited by examiner

*Primary Examiner* — Hoan H Tran
(74) *Attorney, Agent, or Firm* — KENEALY VAIDYA LLP

(57) ABSTRACT

An image forming apparatus records an image on a recording medium including a first layer developing a first color when exceeding a first temperature, a second layer developing a second color when exceeding a second temperature, and a third layer developing a third color when exceeding a third temperature. The image forming apparatus includes a head applying energy to the recording medium from the first layer side and a control device configured to control the energy to be applied to the recording medium by the head so as to form an image of a mixed color of the first color, the second color, and the third color on the recording medium by controlling the head to apply the energy to the recording medium to develop the first color on the recording medium after developing the second color or the third color.

16 Claims, 10 Drawing Sheets

IMAGE FORMING APPARATUS, IMAGE FORMING METHOD, AND NON-TRANSITORY COMPUTER-READABLE STORAGE MEDIUM STORING IMAGE FORMING PROGRAM

REFERENCE TO RELATED APPLICATIONS

This application claims priority from Japanese Patent Application No. 2022-94155 filed on Jun. 10, 2022. The entire content of the priority application is incorporated herein by reference.

BACKGROUND ART

A related-art image forming apparatus performs printing on a print medium having a plurality of color developing layers with different developed colors are known. The related-art image forming apparatus applies energy by heating a print head to a print medium having three color developing layers that develop yellow, magenta, and cyan. The image forming apparatus controls a print head using a signal pattern corresponding to each color to cause a desired color developing layer to develop a desired color and form an image on the print medium. Further, in the related-art image forming apparatus, when forming the image of the black on a print medium, a signal pattern is generated by calculating Logic OR of the signal patterns corresponding to yellow, magenta, and cyan, and the print head is controlled by using the signal patterns.

In some case, there is a deviation in timing at which each color developing layer develops color. In this case, when the print head is controlled by the above-described method, there is a possibility that a portion where yellow is developed may be formed around the image of the black formed by color developing of all the three color developing layers. In this case, there is a problem that the appearance of the image formed on the print medium may deteriorate.

DESCRIPTION

Illustrative aspects of the present disclosure provide an image forming apparatus, an image forming method, and an image forming program that maintains good appearance of an image formed on a print medium even when only one of a plurality of colors develops around an image configured with a mixed color of the plurality of colors.

An image forming apparatus according to a first aspect of the present disclosure is an image forming apparatus configured to record an image on a recording medium while conveying the recording medium, the recording medium including: a first layer configured to develop a first color based on exceeding a first temperature; a second layer configured to develop a second color based on exceeding a second temperature, the second temperature being lower than the first temperature; and a third layer configured to develop a third color based on exceeding a third temperature, the third temperature being lower than the second temperature, the first layer, the second layer, and the third layer being aligned in this order in a thickness direction, the image forming apparatus including: a head configured to apply energy to the recording medium from the first layer side; and a control device configured to control the energy to be applied to the recording medium by the head so as to form an image of a mixed color of the first color, the second color, and the third color on the recording medium by controlling the head to apply the energy to the recording medium to develop the first color on the recording medium after developing the second color or the third color on the recording medium.

In the first aspect, for example, for a recording medium in which the first layer develops yellow, the second layer develops magenta, and the third layer develops cyan, when the image of black that is a mixed color of yellow, magenta, and cyan on the recording medium, developing yellow around the image of the black can be suppressed. Therefore, the image forming apparatus can allow appearance of the image to be maintained to good, for example, when forming the image of the mixed color of the first color, the second color, and the third color on the recording medium.

In the first aspect, the control device may be configured to: form an image of only the first color on the recording medium by controlling and applying energy to the recording medium such that a time average of power supplied to the head during a first time is equal to or larger than a first average power; form an image of only the second color on the recording medium by controlling and applying energy to the recording medium such that the time average of power supplied to the head during a second time is equal to or larger than a second average power, the second time being longer than the first time, the second average power being smaller than the first average power; form an image of only the third color on the recording medium by controlling and applying energy to the recording medium such that the time average of power supplied to the head during a third time is equal to or larger than a third average power, the third time being longer than the second time, the third average power being smaller than the second average power; and form the image of the mixed color of the first color, the second color and the third color by controlling the time average of power supplied to the head during the first time is smaller than the first average power and by controlling the time average of power supplied to the head during the second time is equal or smaller than the second average power. In this case, the image forming apparatus can apply energy to the recording medium by controlling the head so as to develop the first color after developing the second color or the third color.

In the first aspect, the first color may be yellow, the second color may be magenta, and the third color may be cyan. In this case, on the recording medium, the color developed around the image of the black is blue, which is a mixed color of magenta and cyan. Therefore, the image forming apparatus can allow the colors developed around the image of the black to be inconspicuous.

In the first aspect, the first color may be yellow, the second color may be cyan, and the third color may be magenta. In this case, the color developed around the image of the black on the recording medium is blue, which is a mixed color of cyan and magenta. Therefore, the image forming apparatus can allow the colors developed around the image of the black to be inconspicuous.

In the first aspect, the control device may be configured to form the image of the mixed color of the first color, the second color and the third color on the recording medium by controlling the time average of power supplied to the head during the first time is smaller than the first average power and by controlling the time average of power supplied to the head during the second time is smaller than the second average power. In this case, the image forming apparatus can allow the colors developed around the image of the mixed color of the first color, the second color, and the third color to be inconspicuous by setting the colors developed around the image of the mixed color of the first color, the second color, and the third color as the third color or the mixed color of the second color and the third color.

In the first aspect, the control device may be configured to form the image of the mixed color of the first color, the second color and the third color on the recording medium by controlling the time average of power supplied to the head during the first time is smaller than the first average power and by controlling the time average of power supplied to the head during the second time is equal to the second average power. In this case, the image forming apparatus can allow the colors developed around the image of the mixed color of the first color, the second color, and the third color to be inconspicuous by setting the colors developed around the image of the mixed color of the first color, the second color, and the third color as the second color or the mixed color of the second color and the third color.

An image forming method according to a second aspect is an image forming method of recording an image on a recording medium while conveying the recording medium, the recording medium including a first layer configured to develop a first color based on exceeding a first temperature, a second layer configured to develop a second color based on exceeding a second temperature that is lower than the first temperature, and a third layer configured to develop a third color based on exceeding a third temperature that is lower than the second temperature, the first layer, the second layer, and the third layer being aligned in this order in a thickness direction, the image forming method including: forming the image of the mixed color of the first color, the second color, and the third color on the recording medium by steps including: a first step of developing the second color or the third color on the recording medium by applying energy to the recording medium from a head, the head being configured to apply the energy from the first layer side of the recording medium; and a second step of developing the first color on the recording medium by applying energy to the recording medium from the head after developing the second color or the third color in the first step. According to the second aspect, the same effects as those of the first aspect are obtained.

A non-transitory computer-readable storage medium according to a third aspect is a non-transitory computer-readable storage medium storing an image forming program readable by a computer of an image forming apparatus, the image forming apparatus being configured to record an image on a recording medium while conveying the recording medium, the recording medium including a first layer configured to develop a first color based on exceeding a first temperature, a second layer configured to develop a second color based on exceeding a second temperature that is lower than the first temperature, and a third layer configured to develop a third color based on exceeding a third temperature that is lower than the second temperature, the first layer, the second layer, and the third layer being aligned in this order in a thickness direction, the image forming program, when executed by the computer, causing the image forming apparatus to perform operations including: forming the image of the mixed color of the first color, the second color, and the third color on the recording medium by steps including: a first step of developing the second color or the third color on the recording medium by applying energy to the recording medium from a head, the head being configured to apply the energy from the first layer side of the recording medium; and a second step of developing the first color on the recording medium by applying energy to the recording medium from the head after developing the second color or the third color in the first step. According to the third aspect, the same effects as those of the first aspect are obtained.

FIG. 1A is a perspective view of a printer 1 with a cover 3 closed, FIG. 1B is a perspective view of the printer 1 with the cover 3 opened.

FIG. 2 is a plan view of a cassette mounting portion 8 in which a cassette 6 is mounted, with illustration of a bottom surface of the cassette mounting portion 8 omitted.

An illustrative embodiment of the present disclosure will be described in order with reference to the drawings. The drawings to be referred to are used to illustrate technical features that can be employed by the present disclosure, and configurations and the like of devices described are not meant to be limited to the configurations and the like of the devices, but are merely illustrative examples. In the following description, the lower left, upper right, lower right, upper left, upper, and lower sides of FIG. 1 are leftward, rightward, forward, backward, upward, and downward sides of a printer 1, respectively.

<Overview of Printer 1>

The printer 1 will be described with reference to FIGS. 1 and 2. The printer 1 is a heat-sensitive type and thermal transfer type tape printing device. As an example, the printer 1 is loaded with a cassette 6 containing a heat-sensitive tape M as a recording medium. The printer 1 performs printing by heating the heat-sensitive tape M with a thermal head 15 described later while unwinding and conveying the heat-sensitive tape M from the cassette 6.

Figure 1A:
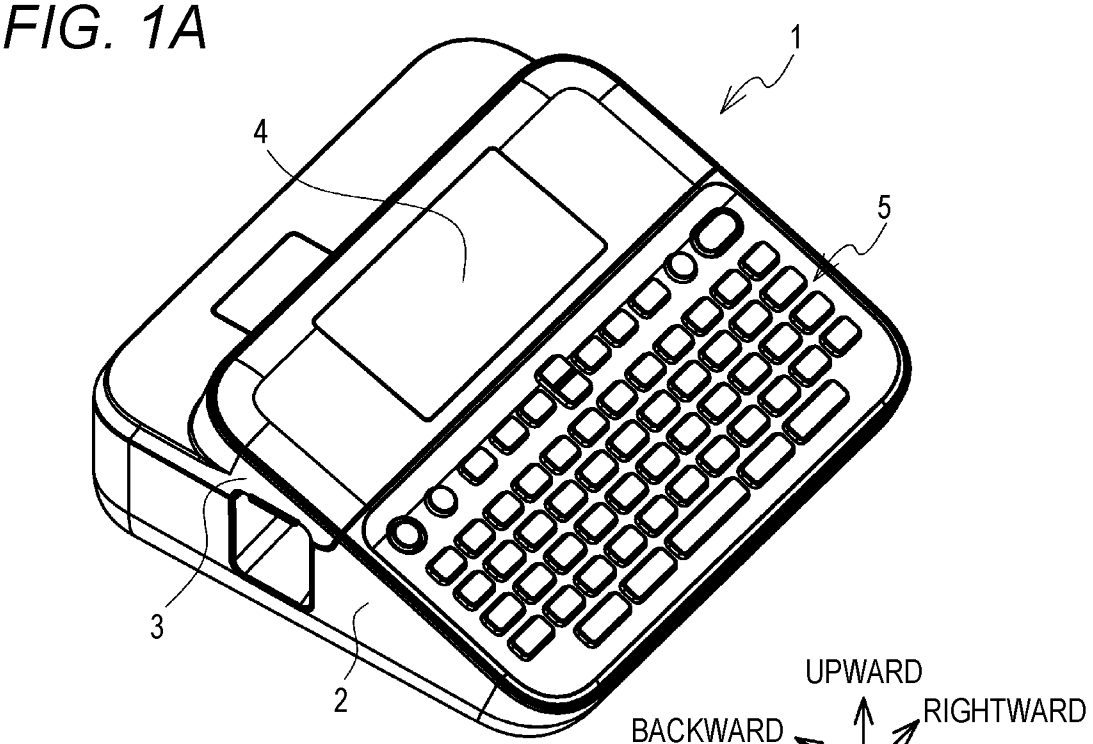
Figure 1B:
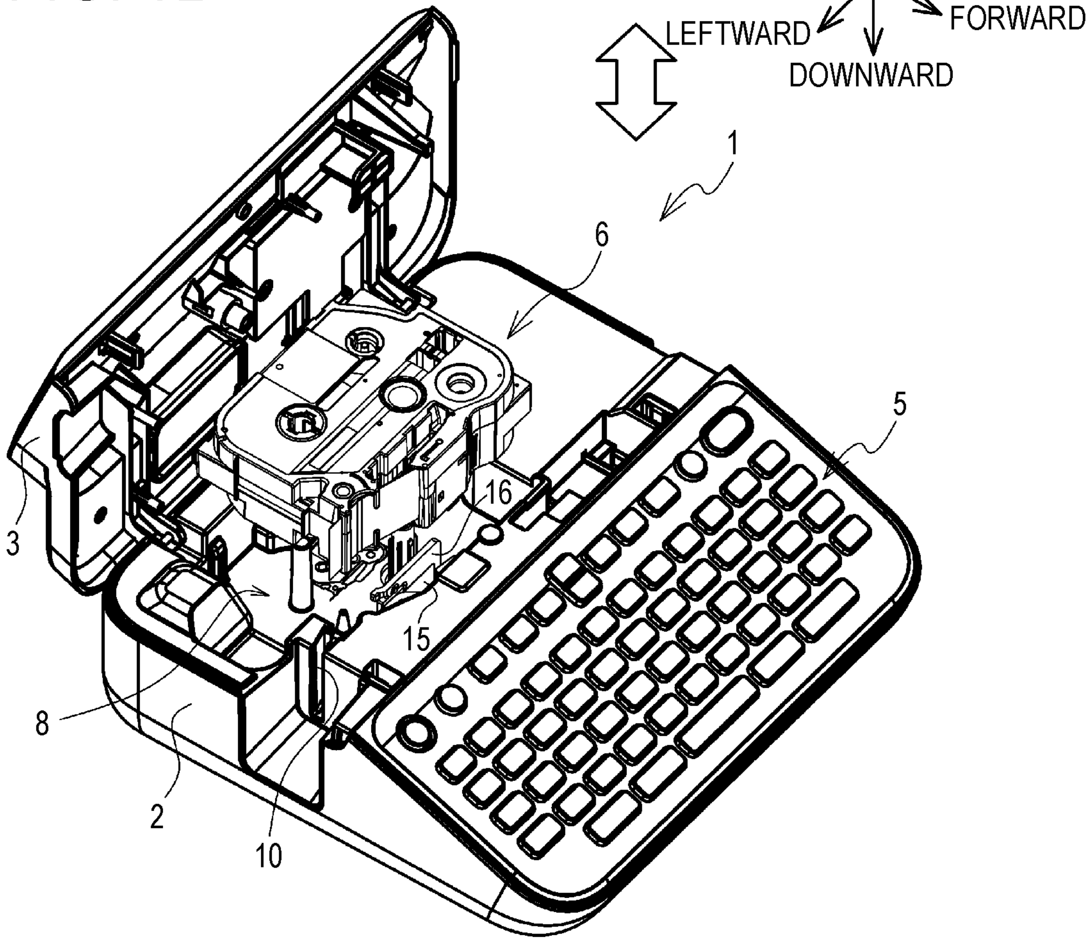

As illustrated in FIGS. 1A and 1B, the printer 1 includes a housing 2, a cover 3, a display 4, and an operation interface 5. The housing 2 has a substantially rectangular parallelepiped shape. A discharge slit 10 is formed on the left side surface of the housing 2. The discharge slit 10 is an opening extending in an up-down direction, and discharges the printing-completed heat-sensitive tape M to the outside of the housing 2. The cover 3 is supported at the rear end portion of the housing 2 so as to be rotatable about a shaft extending in the left-right direction. FIG. 1A illustrates a state where the cover 3 is closed with respect to the housing 2, and FIG. 1B illustrates a state where the cover 3 is opened with respect to the housing 2. For example, when the cassette 6 is replaced, the cover 3 is opened and closed. In the following description, a configuration of each member will be described based on the state where the cover 3 is closed with respect to the housing 2.

As illustrated in FIG. 1A, the display 4 is provided on the upper surface of the cover 3. The display 4 is, for example, a liquid crystal display, and can display various information. The operation interface 5 is disposed on the forward side of the cover 3 and on the forward portion of the upper surface of the housing 2. The operation interface 5 is operated when various instructions are input to the printer 1.

Figure 2:
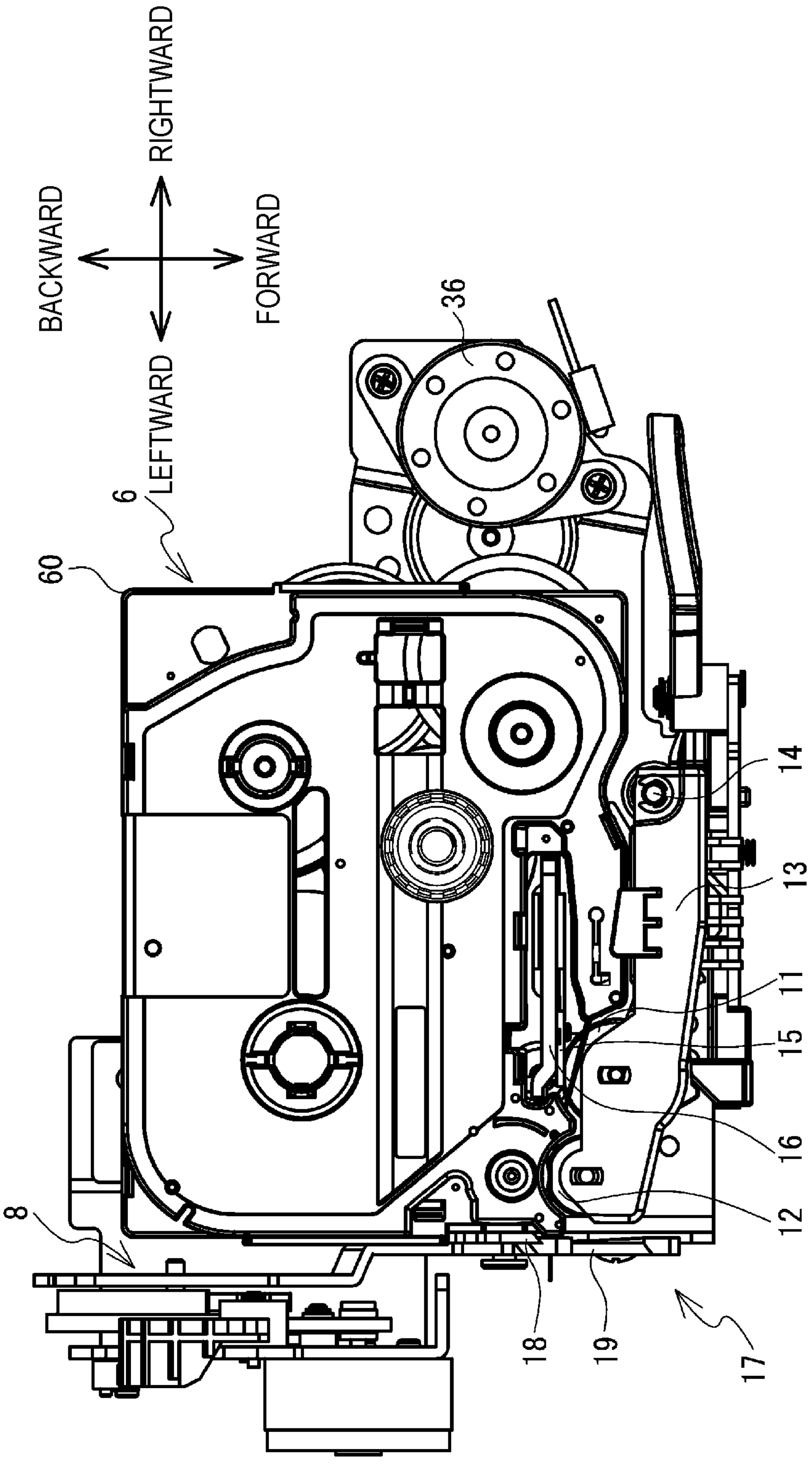

As illustrated in FIGS. 1B and 2, the printer 1 includes a cassette mounting portion 8, a head holder 16, a thermal head 15, a platen holder 13, a platen roller 11, a conveying roller 12, a motor 36, and a cutting mechanism 17 in a space surrounded by the housing 2 and the cover 3.

The cassette mounting portion 8 is a concave portion recessed downward on which the cassette 6 can be mounted. The head holder 16 has a shape of a metal plate provided on the forward portion of the cassette mounting portion 8. The head holder 16 mounts the thermal head 15 on the front surface. The thermal head 15 includes a plurality of heat generation elements.

The platen holder 13 has an arm shape provided on the forward side of the head holder 16. A right end portion of the platen holder 13 is pivotally supported so as to be able to swing around a shaft 14 extending in the up-down direction. The platen roller 11 and the conveying roller 12 are rotatably supported on the left end portion of the platen holder 13 about the shaft extending in the up-down direction. The platen roller 11 faces the thermal head 15 and can come into contact with and separated from the thermal head 15. The conveying roller 12 is located on the left side of the platen roller 11. The conveying roller 12 can come into contact with and separate from a conveying roller (not illustrated) provided on the cassette 6. The platen holder 13 swings between a standby position and a printing position in conjunction with the opening and closing of the cover 3. The printing position is a position where the platen holder 13 is close to the cassette mounting portion 8.

When the cover 3 is opened, the platen holder 13 moves from the printing position toward the standby position. The standby position is a position where the platen holder 13 is separated from the cassette mounting portion 8. When the platen holder 13 is at the standby position, the user can attach and detach the cassette 6 to and from the cassette mounting portion 8. When the cover 3 is closed, the platen holder 13 swings from the standby position toward the printing position. When the cassette 6 is mounted on the cassette mounting portion 8, the platen roller 11 presses the heat-sensitive tape M against the thermal head 15. The conveying roller 12 interposes the heat-sensitive tape M between the conveying roller 12 and the conveying roller of the cassette 6.

The motor 36 is a stepping motor. A rotational driving force of the motor 36 is transmitted to the platen roller 11 and the conveying roller 12. In a case where the motor 36 is driven with the cassette 6 mounted on the cassette mounting portion 8, the platen roller 11 and the conveying roller 12 rotate counterclockwise in plan view.

The cutting mechanism 17 is provided on the left side of the cassette mounting portion 8 and on the right side of the discharge slit 10 (refer to FIG. 1). The cutting mechanism 17 cuts the heat-sensitive tape M discharged from the cassette 6. The cutting mechanism 17 has a fixed blade 18 and a movable blade 19 made of metal. The movable blade 19 is arranged to face the fixed blade 18 and is movable with respect to the fixed blade 18.

<Heat-Sensitive Tape M>

The heat-sensitive tape M is housed inside a housing 60 of the cassette 6. The heat-sensitive tape M is a long-shaped medium and is configured by stacking a plurality of layers. The heat-sensitive tape M can be printed in plurality of colors.

Figure 3:
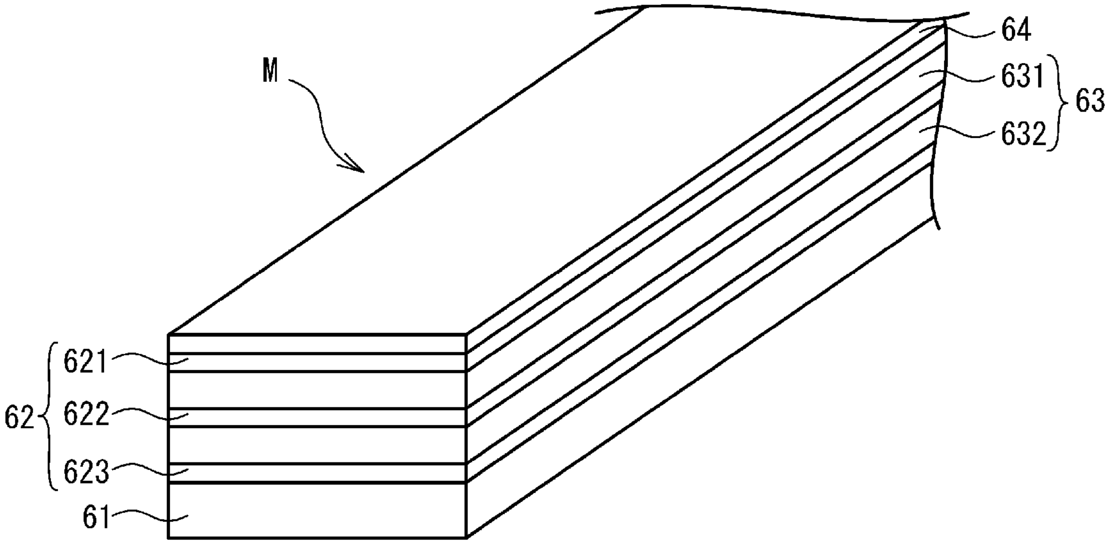
FIG. 3 is a perspective view of a heat-sensitive tape M.

As illustrated in FIG. 3, the heat-sensitive tape M has a base material 61, a plurality of color developing layers 62, a plurality of heat shield layers 63, and an overcoat layer 64. The plurality of color developing layers 62 include a first color developing layer 621, a second color developing layer 622, and a third color developing layer 623. The plurality of heat shield layers 63 include a first heat shield layer 631 and a second heat shield layer 632.

The overcoat layer 64, the first color developing layer 621, the first heat shield layer 631, the second color developing layer 622, the second heat shield layer 632, the third color developing layer 623, and the base material 61 are stacked to be aligned in this order in the thickness direction of the heat-sensitive tape M. The plurality of color developing layers 62 and the plurality of heat shield layers 63 have transparency. During printing by the printer 1, the platen roller 11 is in contact with the surface of the heat-sensitive tape M on the base material 61 side. The thermal head 15 is in contact with the first color developing layer 621 side of the plurality of color developing layers 62 of the heat-sensitive tape M, that is, the surface of the overcoat layer 64.

The base material 61 is a resin film. Each layer of the plurality of color developing layers 62 includes a color developing portion that develops color when the temperature is increased. The first heat shield layer 631 suppresses heat conduction between the first color developing layer 621 and the second color developing layer 622 adjacent to each other. The second heat shield layer 632 suppresses heat conduction between the second color developing layer 622 and third color developing layer 623 adjacent to each other. The overcoat layer 64 protects the plurality of color developing layers 62.

When the temperature exceeds a predetermined first temperature T1, the transparency of the first color developing layer 621 is decreased. Accordingly, the first color developing layer 621 develops the first color. For example, the first color is yellow. When the temperature exceeds a second temperature T2, the transparency of the second color developing layer 622 is decreased. Accordingly, the second color developing layer 622 develops the second color. For example, the second color is magenta. When the temperature exceeds a predetermined third temperature T3, the transparency of the third color developing layer 623 is decreased. Accordingly, the third color developing layer 623 develops the third color. For example, the third color is cyan. The second temperature T2 is lower than the first temperature T1 (T1>T2). The third temperature T3 is lower than the second temperature T2 (T2>T3).

It is noted that in this illustrative embodiment, each color of yellow, magenta, and cyan is defined in a Munsell color system. More specifically, yellow is a color defined by YR, Y in the Munsell color system. Magenta is a color defined by RP, P in the Munsell color system. Cyan is a color defined by B, PB in the Munsell color system.

<Outline of Printing Operation>

The printer 1 unwinds the heat-sensitive tape M from the cassette 6 and conveys the heat-sensitive tape toward the discharge slit 10. The heat-sensitive tape M is pressed against the thermal head 15 by the platen roller 11 while passing between the thermal head 15 and the platen roller 11. The printer 1 applies a voltage to the plurality of heat generation elements of the thermal head 15 in this state. Power is supplied to the plurality of heat generation elements in accordance with flow of a current due to voltage application. The plurality of heat generation elements generate heat when the power is supplied. The plurality of heat generation elements generating heat apply energy to the heat-sensitive tape M from the first color developing layer 621 side. Accordingly, the plurality of color developing layers 62 of the heat-sensitive tape M are heated to develop a color, and thus, an image is printed on the heat-sensitive tape M.

The printing-completed heat-sensitive tape M is conveyed by the platen roller 11 and the conveying roller 12 rotated by the driving of the motor 36 and discharged to the outside of the printer 1 through the discharge slit 10.

<Electrical Configuration>

Figure 4:
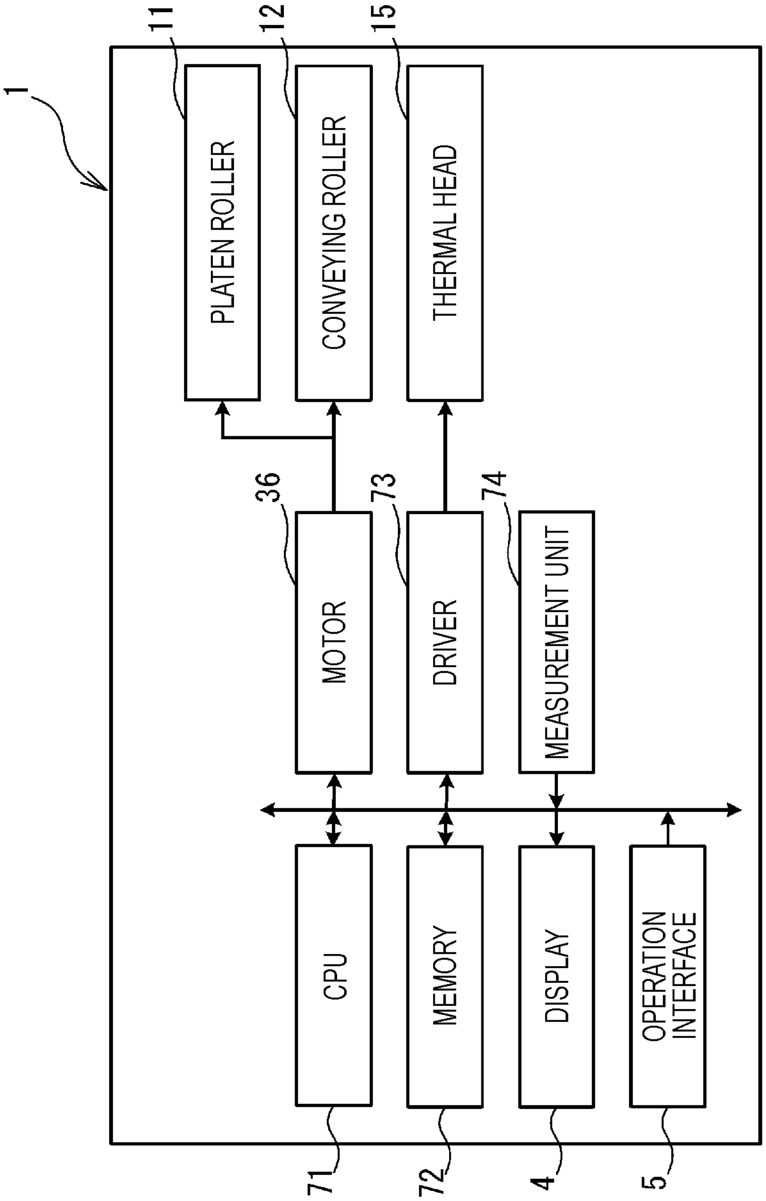
FIG. 4 is a block diagram illustrating an electrical configuration of the printer 1.

The electrical configuration of the printer 1 will be described with reference to FIG. 4. The printer 1 includes a CPU 71 that generally controls the printer 1. The CPU 71 is electrically connected to a memory 72, the display 4, the operation interface 5, the motor 36, the driver 73 and a measurement unit 74. The memory 72 stores programs executed by the CPU 71 and print data. Various types of information is displayed on the display 4 according to signals output from the CPU 71. A signal indicating an input operation performed on the operation interface 5 is output from the operation interface 5 to the CPU 71. The CPU 71 can detect the input operation performed on the operation interface 5 by detecting the signal output from the operation interface 5.

The motor 36 is driven according to the signal output from the CPU 71 to rotate the platen roller 11 and the conveying roller 12. The driver 73 supplies power to the plurality of heat generation elements of the thermal head 15 according to the signals output from the CPU 71. The measurement unit 74 measures the power supplied to the plurality of heat generation elements of the thermal head 15 and outputs a signal indicating the measured power to the CPU 71. The CPU 71 can detect the power actually supplied to the plurality of heat generation elements of the thermal head 15 based on the signal output from the measurement unit 74.

<Details of Printing Operation>

Details of the printing operation will be described. During the printing operation, the driver 73 periodically supplies power to the plurality of heat generation elements of the thermal head 15 based on the signals output from the CPU 71. FIGS. 5A to 5D illustrate changes over time in the signals output from the CPU 71 to the driver 73. When the signal output from the CPU 71 is at a high level, the driver 73 supplies power to the plurality of heat generation elements of the thermal head 15, and when the signal output from the CPU 71 is at a low level, the driver 73 stops supplying of power to the plurality of the heat generation elements of the thermal head 15.

Figure 5A:
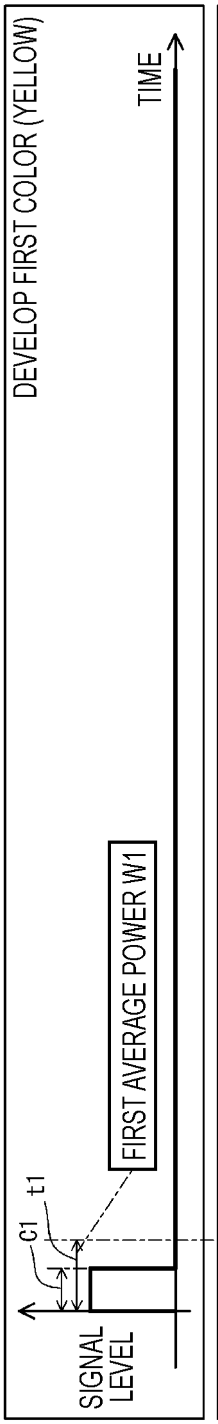
FIGS. 5A to 5D are diagrams illustrating patterns of signals output to a driver 73 for supplying power to a thermal head 15 in this illustrative embodiment.

As illustrated in FIG. 5A, when the first color developing layer 621 develops colors to form the image of only the yellow on the heat-sensitive tape M, one high level signal having a time width C1 is output to the driver 73. Accordingly, power is supplied from the driver 73 to the plurality of heat generation elements of the thermal head 15. The plurality of heat generation elements generate heat to apply energy to the heat-sensitive tape M, and the first color developing layer 621 develops yellow.

The time during which power is supplied to form the image of yellow on the heat-sensitive tape M is defined as a first time t1. The first time t1 coincides with one repetition period of the high level signal output to the driver 73. The time average of power supplied to the thermal head 15 during the first time t1 is referred to as a first average power W1. It is noted that, when the time average of power supplied during the first time t1 is equal to or larger than the first average power W1, the first color developing layer 621 develops yellow.

Figure 5B:
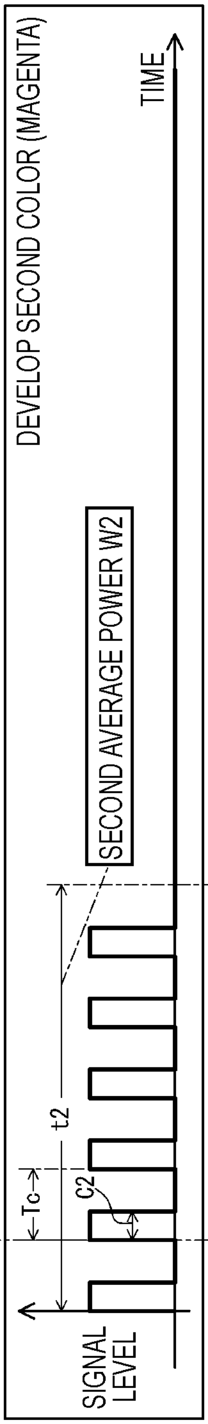

As illustrated in FIG. 5B, when the second color developing layer 622 develop colors to form the image of only the magenta on the heat-sensitive tape M, six high level signals having a time width C2 is periodically output to the driver 73 at a period Tc. 6. The time width C2 is less than the time width C1 (C1>C2). Accordingly, power is supplied from the driver 73 to the plurality of heat generation elements of the thermal head 15. The plurality of heat generation elements generate heat to apply energy to the heat-sensitive tape M, and the second color developing layer 622 develops magenta.

The time during which power is applied to form the image of magenta on the heat-sensitive tape M is defined as a second time t2. The second time t2 coincides with six repetition periods of the high level signal output to the driver 73. The second time t2 is longer than the first time t1 (t1<t2). The time average of power supplied to the thermal head 15 during the second time t2 is referred to as a second average power W2. The second average power W2 is less than the first average power W1 (W1>W2). It is noted that, when the time average of power supplied during the second time t2 is equal to or larger than the second average power W2, the second color developing layer 622 develops magenta.

Figure 5C:
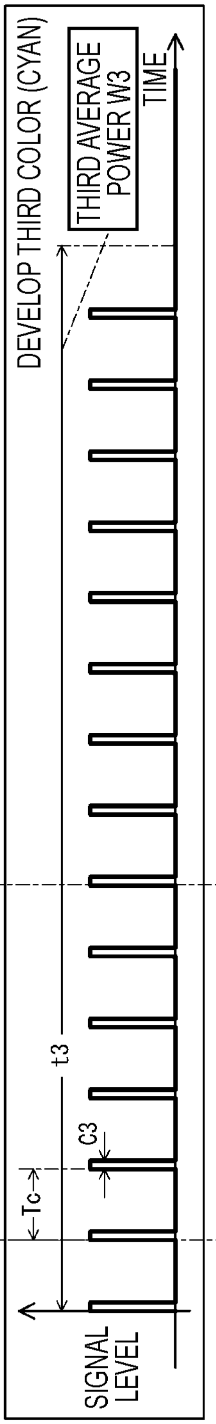

As illustrated in FIG. 5C, when the third color developing layer 623 develop colors to form the image of only the cyan on the heat-sensitive tape M, 15 high level signals having a time width C3 is periodically output to the driver 73 at a period Tc. The time width C3 is less than the time width C2 (C2>C3). Accordingly, power is supplied from the driver 73 to the plurality of heat generation elements of the thermal head 15. The plurality of heat generation elements generate heat to apply energy to the heat-sensitive tape M, and the third color developing layer 623 develops cyan.

The time during which power is applied to form the image of cyan on the heat-sensitive tape M is defined as a third time t3. The third time t3 coincides with 15 repetition periods of the high level signal output to the driver 73. The third time t3 is longer than the second time t2 (t2<t3). The time average of power supplied to the thermal head 15 during the third time t3 is referred to as a third average power W3. The third average power W3 is less than the second average power W2 (W2>W3). It is noted that, when the time average of power supplied during the third time t3 is equal to or larger than the third average power W3, the third color developing layer 623 develops cyan.

Figure 5D:
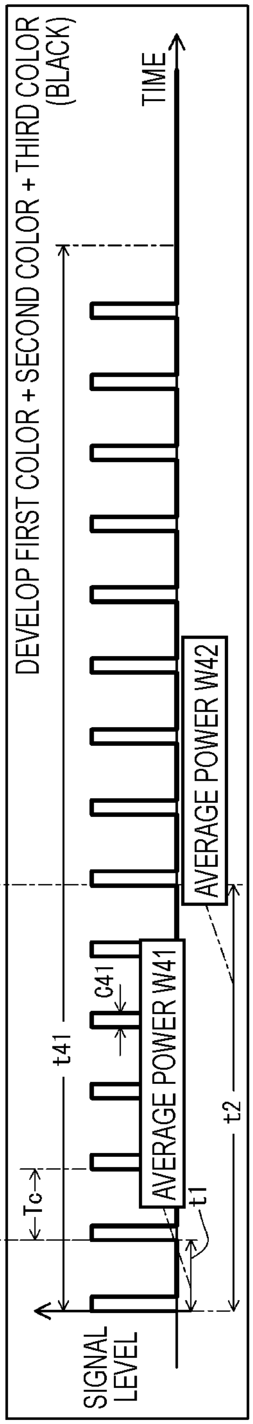

A case in which all of the first color developing layer 621, the second color developing layer 622, and the third color developing layer 623 are allowed to develop colors to form the image of the black that is a mixed color of yellow, magenta, and cyan, on the heat-sensitive tape M will be described. In this case, as illustrated in FIG. 5D, 15 high level signals having a time width C41 are periodically output to the driver 73 at the period Tc. The time width C41 is smaller than the time widths C1 and C2 and larger than the time width C3 (C1>C2>C41>C3). The time during which power is supplied to form the image of the black on the heat-sensitive tape M is defined as a fourth time t41. The fourth time t41 coincides with 15 repetition periods of the high level signal output to the driver 73. The fourth time t41 is equal to the third time t3 (t3=t41).

In the case of forming the image of the black on the heat-sensitive tape M, the time average of power supplied to the thermal head 15 during the first time t1 after the high level signal is first output to the driver 73 is referred to as an average power W41. The average power W41 is less than the first average power W1 (W1>W41). In the case of forming the image of the black on the heat-sensitive tape M, the time average of power supplied to the thermal head 15 during the second time t2 after the high level signal is first output to the driver 73 is referred to as an average power W42. The average power W42 is less than the second average power W2 (W2>W42).

Figures 6A, 6B, 6C:
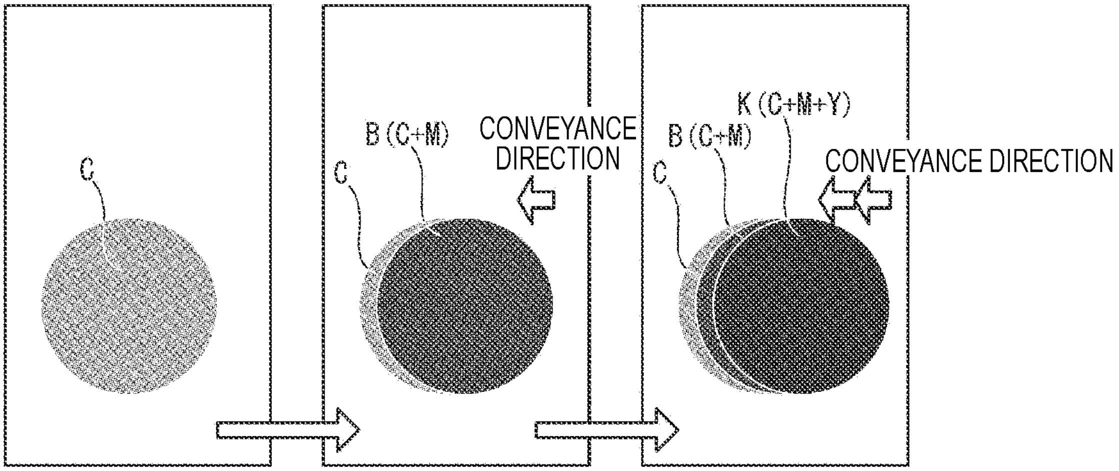
FIGS. 6A to 6C are diagrams illustrating an aspect where an image of the black is formed by developing colors in order of cyan, magenta, and yellow.

In response to the signal illustrated in FIG. 5D being output to the driver 73, power is supplied from the driver 73 to the plurality of heat generation elements of the thermal head 15, and the plurality of heat generation elements generate heat to apply energy to the heat-sensitive tape M. In this case, as illustrated in FIGS. 6A to 6C, the third color developing layer 623 first develops cyan (C) (FIG. 6A). Next, the second color developing layer 622 develops magenta (M) (FIG. 6B). The portion where cyan (C) and magenta (M) overlap becomes blue (B), which is a mixed color of the respective colors. Next, the first color developing layer 621 develops yellow (Y) (FIG. 6C). The portion where cyan (C), magenta (M), and yellow (Y) overlap becomes black (K), which is a mixed color of the respective colors. As described above, the image of black (K) is finally formed on the heat-sensitive tape M.

It is noted that the heat-sensitive tape M is heated by the thermal head 15 while being conveyed. For this reason, when the printer 1 forms the image of the black on the heat-sensitive tape M as described above, in response to difference of color developing timings of cyan, magenta, and yellow, the positions of the respective developed colors slightly deviate in the conveyance direction of the heat-sensitive tape M. For example, as illustrated in FIG. 6B, the portion of cyan (C) previously developed is formed adjacently around the portion of blue (B), which is a mixed color of cyan (C) and magenta (M). Further, as illustrated in FIG. 6C, for example, the portion of blue (B), which is a mixed color of cyan (C) and magenta (M) is formed adjacently around the portion of black (K), which is a mixed color of cyan (C), magenta (M), and yellow (Y).

Figures 7A, 7B, 7C:
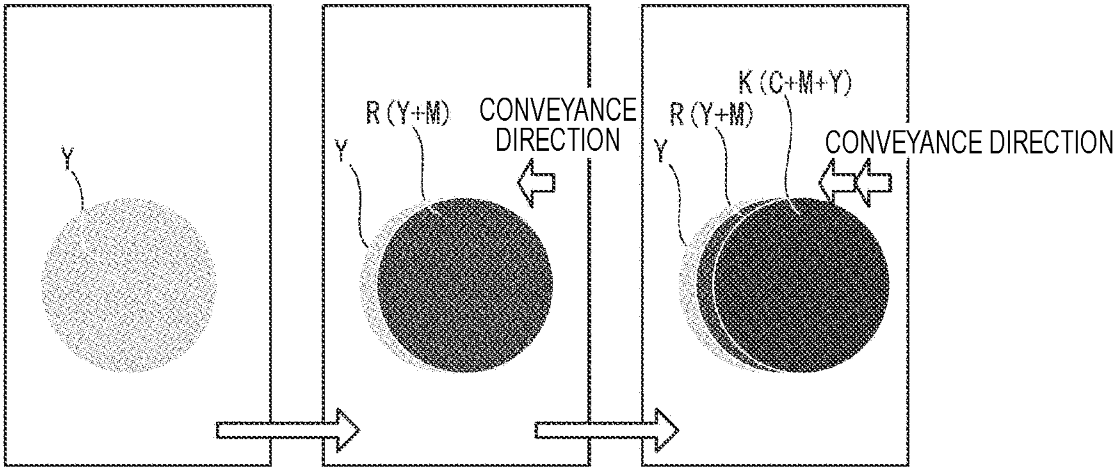
FIGS. 7A to 7C are diagrams illustrating an aspect where the image of the black is formed by developing colors in order of yellow, magenta, and cyan.

It is noted that unlike the above, as illustrated in FIGS. 7A to 7C, a case is considered where first, the first color developing layer 621 develops yellow (Y) (FIG. 7A), then, the second color developing layer 622 develops magenta (M) (FIG. 7B), and then, the third color developing layer 623 develops cyan (C) (FIG. 7C). In this case, for example, as illustrated in FIG. 7B, the portion of yellow (Y) previously developed is formed adjacently around the portion of red (R), which is a mixed color of yellow (Y) and magenta (M). For example, as illustrated in FIG. 7C, the portion of red (R), which is a mixed color of yellow (Y) and magenta (M) is formed adjacently around the portion of black (K), which is a mixed color of cyan (C), magenta (M), and yellow (Y). In this case, particularly, since the color difference between black (K) and yellow (Y) is large, the portion of yellow (Y) is allowed to be easily conspicuous.

On the other hand, as illustrated in FIG. 6C, in the case of this illustrative embodiment, since the color difference between black (K) and cyan (C) is smaller than the color difference between black (K) and yellow (Y) illustrated in FIG. 7C, the portion of cyan (C) is hard to be conspicuous. As described above, according to this illustrative embodiment, developing yellow around the image of the black is suppressed, so that the appearance of the image formed on the heat-sensitive tape M can be maintained to be good.

<Main Process>

Figure 8:
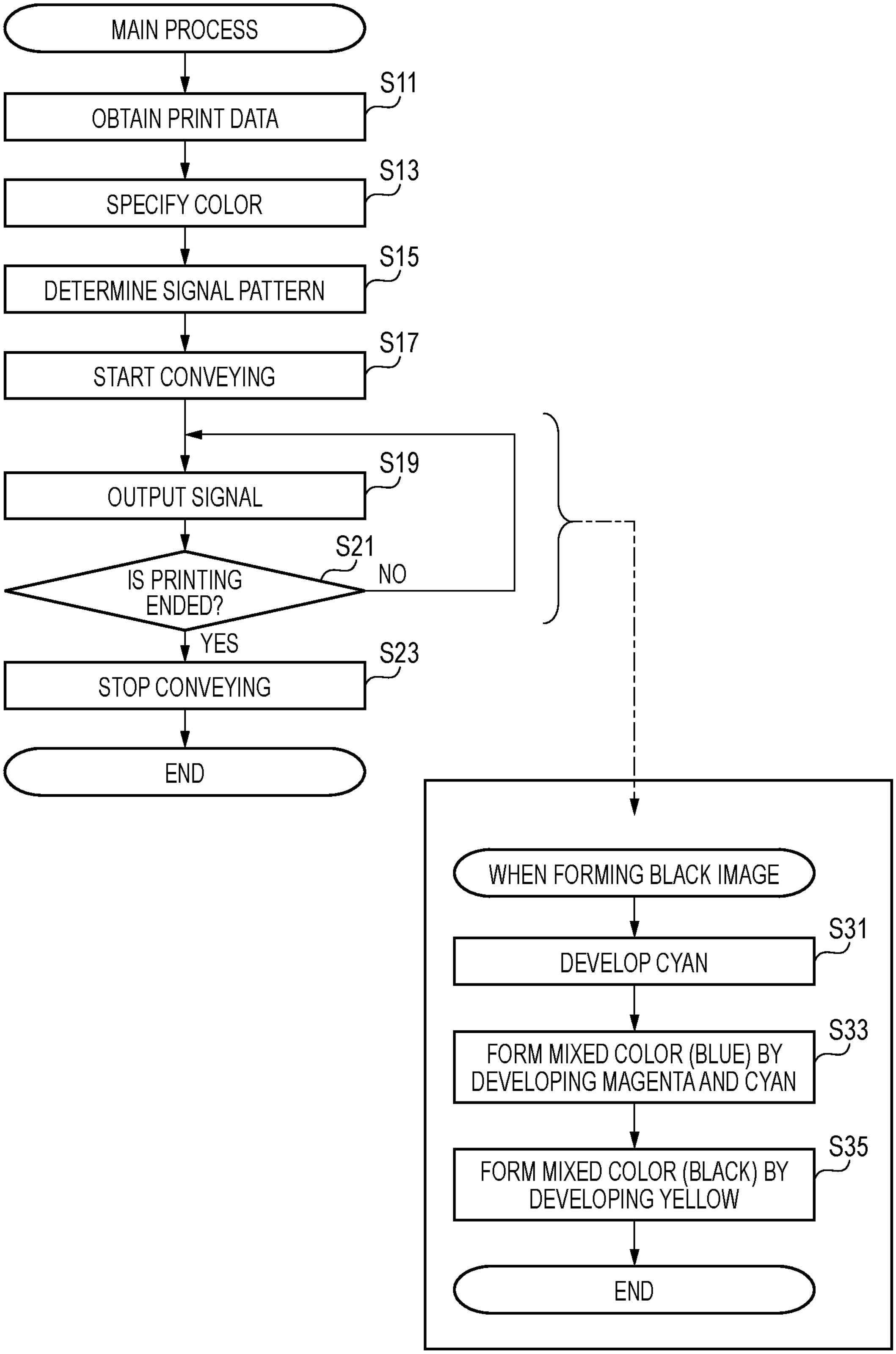
FIG. 8 is a flowchart of a main process.

A main process will be described with reference to FIG. 8. When the CPU 71 detects an input operation for starting printing via the operation interface 5, the main process is started by reading and executing the program stored in the memory 72.

The CPU 71 obtains the print data stored in the memory 72 (S11). The CPU 71 specifies colors included in the image to be printed based on the obtained print data (S13). The CPU 71 determines a pattern (refer to FIGS. 5A to 5D) of the signal to be output to the driver 73 so as to develop the heat-sensitive tape M in the specified color (S15).

The CPU 71 drives the motor 36 to start rotation of the platen roller 11 and the conveying roller 12. Accordingly, the CPU 71 starts conveyance of the heat-sensitive tape M unwound from the cassette 6 (S17). The CPU 71 outputs a signal to the driver 73 based on the pattern determined in S15 (S19).

For example, when forming the image of the black on the heat-sensitive tape M, the CPU 71 outputs a signal of a pattern illustrated in FIG. 5D to the driver 73. The driver 73 supplies power to the plurality of heat generation elements of the thermal head 15 based on the signal output by the CPU 71. In this case, the time average of power supplied to the thermal head 15 during the first time t1 becomes the average power W41 that is less than the first average power W1 (W1>W41), and the time average of power supplied to the thermal head 15 during the second time t2 becomes an average power W42 that is less than the second average power W2 (W2>W42).

When power is supplied from the driver 73 to the thermal head 15, the plurality of heat generation elements of the thermal head 15 generate heat and apply energy to the heat-sensitive tape M. Accordingly, the third color developing layer 623 first develops cyan (S31, refer to FIG. 6A). Next, the second color developing layer 622 develops magenta (S33, refer to FIG. 6B). A portion where cyan and magenta overlap becomes blue, which is a mixed color of the respective colors. Next, the first color developing layer 621 develops yellow (S35, FIG. 6C). Accordingly, a portion where cyan, magenta, and yellow overlap becomes black (K), which is a mixed color of the respective colors. As described above, the image of the black (K) is formed on the heat-sensitive tape M.

The CPU 71 determines whether printing based on the print data is completely ended (S21). When the CPU 71 determines that printing is not completely ended (S21: NO), the process returns to S19. The CPU 71 repeats the process of S19 based on the print data obtained in S11. When the CPU 71 determines that all printing is completed (S21: YES), the CPU 71 stops driving of the motor 36 to stop the rotation of the platen roller 11 and the conveying roller 12. Accordingly, the CPU 71 stops the conveyance of the heat-sensitive tape M started in S11 (S23). The CPU 71 ends the main process.

Advantages of the Present Illustrative Embodiment

As described above, the printer 1 controls the thermal head 15 so as to first develop cyan on the heat-sensitive tape M, next develop magenta on the heat-sensitive tape M, and next develop yellow on the heat-sensitive tape M. Accordingly, the printer 1 forms the image of the black that is a mixed color of cyan, magenta, and yellow, on the heat-sensitive tape M. In this case, the printer 1 can suppress a yellow portion having a large color difference from black from being formed around the portion of black. Therefore, the printer 1 can allow the appearance of the image of black printed on the heat-sensitive tape M to be good.

In the heat-sensitive tape M, the first color developed by the first color developing layer 621 is yellow, the second color developed by the second color developing layer 622 is magenta, and the third color developed by the third color developing layer 623 is cyan. Also, the heat-sensitive tape M is applied with energy from the first color developing layer 621 side by the thermal head 15 to develop colors. In this case, the printer 1 can appropriately perform developing cyan, magenta, and yellow in this order by controlling the energy applied to the heat-sensitive tape M from the thermal head 15.

When forming the image of the black on the heat-sensitive tape M, the printer 1 sets the time average of power supplied to the thermal head 15 during the first time t1 as an average power W41 that is less than the first average power W1 and sets the time average of power supplied to the thermal head 15 during the second time t2 as an average power W42 that is less than the second average power W2. Accordingly, the printer 1 can cause the heat-sensitive tape M to develop colors in the order of cyan, magenta, and yellow. In this case, the color developed around the portion of black on the heat-sensitive tape M is blue, which is a mixed color of cyan and magenta or cyan. Therefore, the printer 1 can reduce the color difference between the color developed around the portion of black and black, so that the color developed around the portion of black can be allowed to be inconspicuous.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modified Example

Modified example of this illustrative embodiment will be described with reference to FIGS. 9A to 11. In the modified example, the pattern of signals output to the driver 73 when forming the image of the black that is a mixed color of yellow, magenta, and cyan, on the heat-sensitive tape M is different from that illustrated in FIG. 9D. The pattern of signals in FIGS. 9A, 9B, and 9C are the same as those in FIGS. 5A, 5B, and 5C, respectively.

Figures 9A, 9B, 9C, 9D:
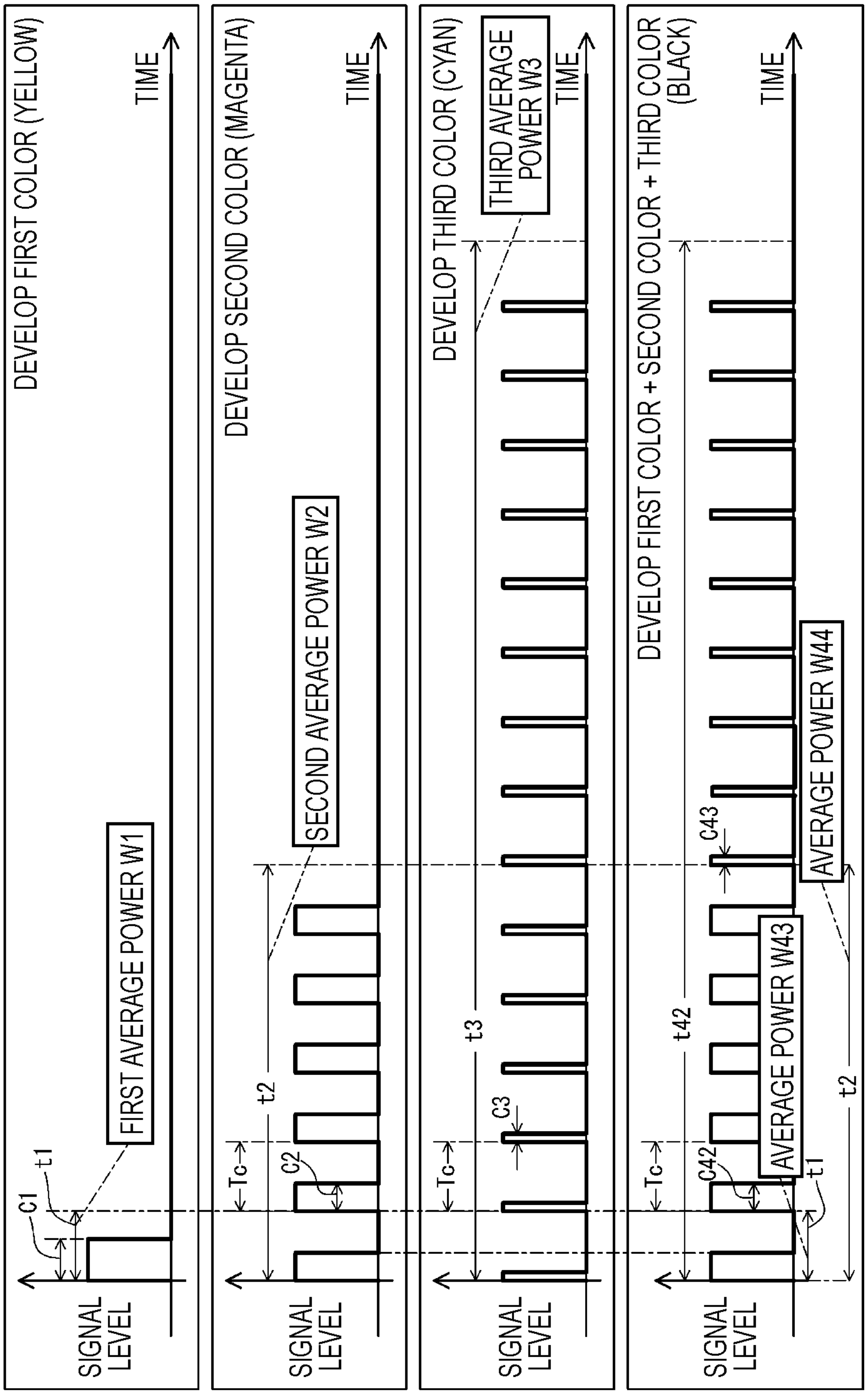
FIGS. 9A to 9D are diagrams illustrating patterns of signals output to the driver 73 for supplying power to the thermal head 15 in a modified example.

FIG. 9D illustrates the pattern of signal in the case where all the first color developing layer 621, the second color developing layer 622, and the third color developing layer 623 develop colors to form the image of the black that is a mixed color of yellow, magenta, and cyan on the heat-sensitive tape M. First, six high level signals having a time width C42 are periodically output to the driver 73 at a period Tc, and then, nine high level signals with a time width C43 are periodically output to the driver 73 at a period Tc. The time width C42 is equal to the time width C2 of the high level signal that is output when magenta is developed (C2=C42). A fourth time t42 during which power is supplied to form the image of the black on the heat-sensitive tape M is equal to the third time t3 when developing cyan (t3=t42).

The time average of power supplied to the thermal head 15 during the first time t1 after the high level signal is first output to the driver 73 is referred to as an average power W43. The average power W43 is less than the first average power W1 (W1>W43). The time average of power supplied to the thermal head 15 during the second time t2 after the high level signal is first output to the driver 73 is referred to as an average power W44. The average power W44 is equal to the second average power W2 (W2=W44).

Figures 10A, 10B, 10C:
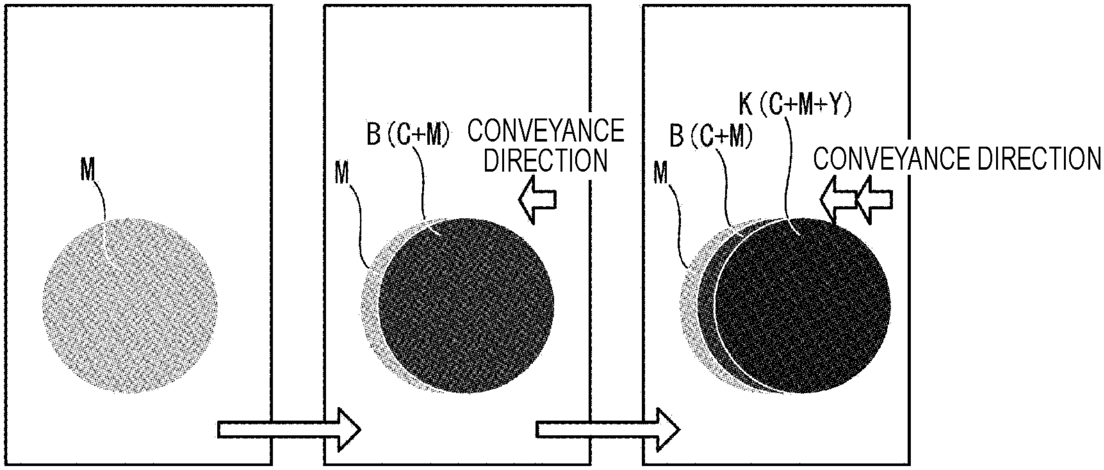
FIGS. 10A to 10C are diagrams illustrating an aspect where the image of the black is formed by developing colors in order of magenta, cyan, and yellow.

The power is supplied from the driver 73 to the plurality of heat generation elements of the thermal head 15, and the plurality of heat generation elements generate heat to apply energy to the heat-sensitive tape M. In this case, as illustrated in FIGS. 10A to 10C, the second color developing layer 622 first develops magenta (M) (FIG. 10A). Next, the third color developing layer 623 develops cyan (C) (FIG. 10B). The portion where cyan (C) and magenta (M) overlap becomes blue (B), which is a mixed color of the respective colors. Next, the first color developing layer 621 develops yellow (Y) (FIG. 10C). Accordingly, the portion where cyan (C), magenta (M), and yellow (Y) overlap becomes black (K), which is a mixed color of the respective colors. As described above, the image of black (K) is finally formed on the heat-sensitive tape M.

It is noted that, in response to heating by the thermal head 15 while conveying the heat-sensitive tape M, the positions of the respective developed colors slightly deviate in the conveyance direction of the heat-sensitive tape M. For example, as illustrated in FIG. 10B, the portion of magenta (M) previously developed is formed adjacently around the portion of blue (B), which is a mixed color of cyan (C) and magenta (M). Further, as illustrated in FIG. 10C, for example, a portion of blue (B), which is a mixed color of cyan (C) and magenta (M) is formed adjacently around the portion of black (K), which is a mixed color of cyan (C), magenta (M), and yellow (Y).

In the modified example, since the color difference between black (K) and magenta (M) is smaller than the color difference between black (K) and yellow (Y) (refer to FIG. 7C), the portion of magenta (M) becomes inconspicuous. In this manner, even in the modified example, developing yellow around the image of the black, the appearance of the image formed on the heat-sensitive tape M can be maintained to be good.

The main process in the modified example will be described with reference to FIG. 11. The main process in the modified example is different from the above-described illustrative embodiment in that S191 is executed instead of S19 in FIG. 8. Since the other processes are the same as those of the above-described illustrative embodiment, common processes are given the same step numbers as in FIG. 8, and descriptions thereof are omitted.

Figure 11:
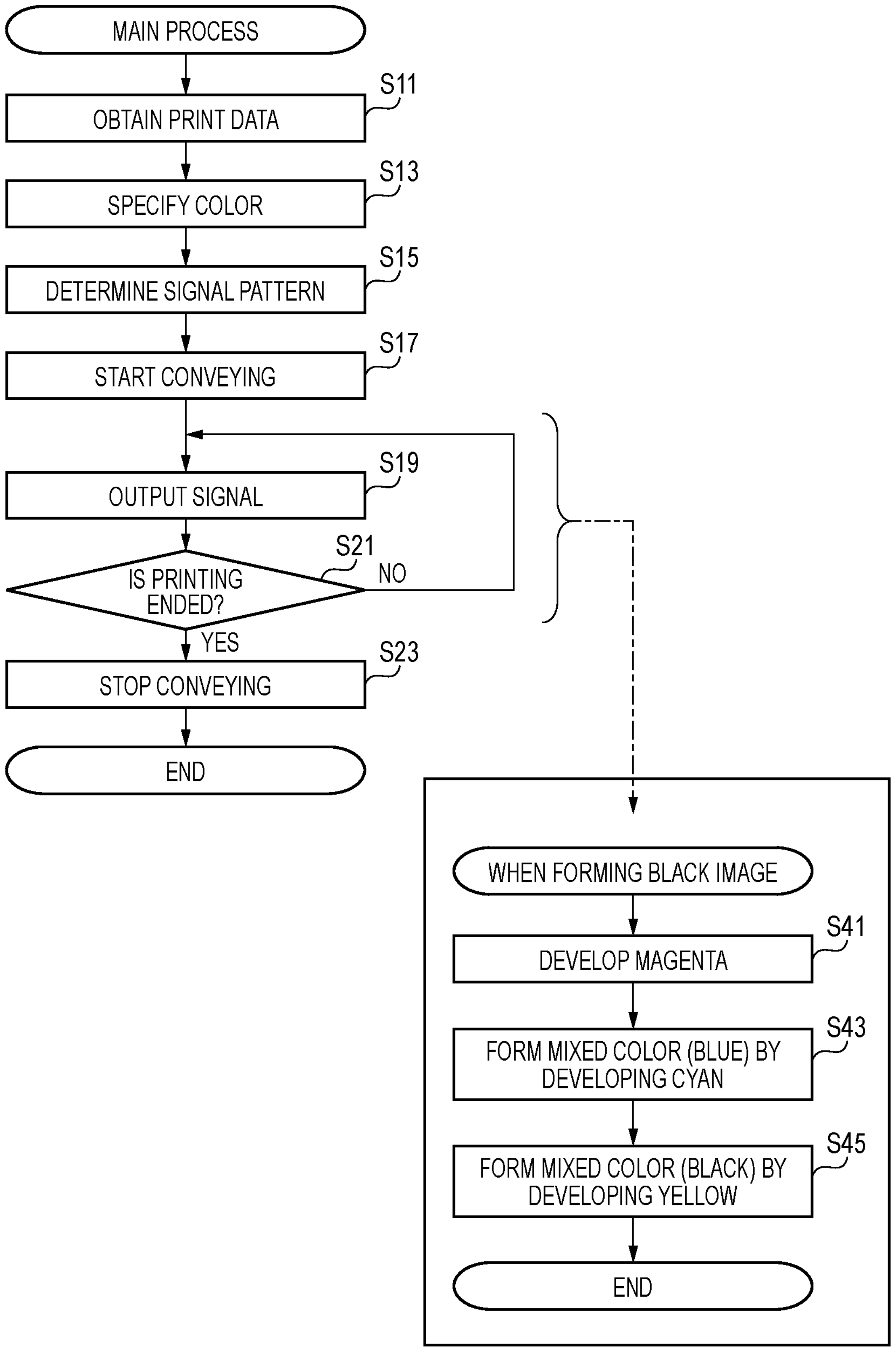
FIG. 11 is a flowchart of the main process in the modified example.

As illustrated in FIG. 11, the CPU 71 outputs a signal to the driver 73 based on the pattern determined in S15 (S191). For example, when forming the image of the black on the heat-sensitive tape M, the CPU 71 outputs a pattern signal illustrated in FIG. 9D to the driver 73. The driver 73 supplies power to the plurality of heat generation elements of the thermal head 15. In this case, the time average of power supplied to the thermal head 15 during the first time t1 is the average power W43 that is less than the first average power W1 (W1>W43), and the time average of power supplied to the thermal head 15 during the second time t2 is the average power W44 that is equal to the second average power W2 (W2=W44).

When power is supplied from the driver 73 to the thermal head 15, the plurality of heat generation elements of the thermal head 15 generate heat and apply energy to the heat-sensitive tape M. Accordingly, the second color developing layer 622 first develops magenta (S41, refer to FIG. 10A). Next, the third color developing layer 623 develops cyan (S43, refer to FIG. 10B). The portion where cyan and magenta overlap becomes blue, which is a mixed color of the respective colors. Next, the first color developing layer 621 develops yellow (S45, FIG. 10C). Accordingly, the portion where cyan, magenta, and yellow overlap becomes black (K) that is a mixed color of the respective colors. As described above, the image of black (K) is formed on the heat-sensitive tape M.

As described above, when the printer 1 forms the image of the black on the heat-sensitive tape M, the time average of power supplied to the thermal head 15 during the second time t2 is set as the average power W44 equal to the second average power W2. Thereby, the heat-sensitive tape M can be developed in magenta, cyan, and yellow in this order. Therefore, the printer 1 can allow the color developed around the image of the black to be inconspicuous by setting the color developed around the portion of black as magenta or blue which is the mixed color of cyan and magenta.

Other Modified Examples

Each of the first color (yellow), second color (magenta), and third color (cyan) is not limited to the above-described illustrative embodiment, and at least one of the first color (yellow), second color (magenta), and third color (cyan) may be another color. For example, the first color developing layer 621 may develop yellow, the second color developing layer 622 may develop cyan, and the third color developing layer 623 may develop magenta. In this case, the first color corresponds to yellow, the second color to cyan, and the third color to magenta. Even in this case, the color developed around the portion of black of the heat-sensitive tape M is blue, which is a mixed color of cyan and magenta. Therefore, the printer 1 can allow the color developed around the portion of black to be inconspicuous.

The cassette 6 may also have a transparent film. The printer 1 may apply a transparent film to the heat-sensitive tape M printed by the thermal head 15, and after that, discharge the heat-sensitive tape M from the discharge slit 10. The heat-sensitive tape M needs not to have the plurality of heat shield layers 63. In this case, the first color developing layer 621 and the second color developing layer 622 may be in direct contact with each other at the boundary portion, and the second color developing layer 622 and the third color developing layer 623 may be in direct contact with each other at the boundary. The number of color developing layers of the heat-sensitive tape M is not limited to three, and may be four or more.

The printer 1 may control the thermal head 15 to supply power to the heat-sensitive tape M so that the second color developing layer 622 and the third color developing layer 623 develop colors at the same time.

The pattern of signals illustrated in FIGS. 5 and 9 may be changed as appropriate. For example, the pattern of signals may be changed as follows.

The plurality of high level signals may be output to the driver 73 in order to allow the first color developing layer 621 to develop a color. In this case, the time widths of the plurality of high level signals may be the same or may be different. Also, in this case, the periods of the high level signals may be the same or may be output at random.

The periods Tc of the high level signals output to the driver 73 for allowing the first color developing layer 621, the second color developing layer 622, and the third color developing layer 623 to develop colors may be different from each other.

The time widths C2 of the plurality of high level signals output to the driver 73 for allowing the second color developing layer 622 to develop a color may be different from each other. The period of the high level signal output to the driver 73 for allowing the second color developing layer 622 to develop a color may be switched at any timing of the second time t2. The high level signal output to the driver 73 for allowing the second color developing layer 622 to develop a color may be output at random intervals.

The time widths C3 of the plurality of high level signals output to the driver 73 for allowing the third color developing layer 623 to develop a color may be different from each other. The period of the high level signal output to the driver 73 for allowing the third color developing layer 623 to develop a color may be switched at any timing of the third time t3. The high level signal output to the driver 73 for allowing the third color developing layer 623 to develop a color may be output at random intervals.

The time widths C41, C42, and C43 of the plurality of high level signals output to the driver 73 for allowing the first color developing layer 621, the second color developing layer 622, and the third color developing layer 623 to develop colors may be different from each other. The period of the high level signal output to the driver 73 for allowing the first color developing layer 621, the second color developing layer 622, and the third color developing layer 623 to develop colors may be switched at any timing of the fourth time t41 and t42. The high level signal output to the driver 73 for allowing the first color developing layer 621, the second color developing layer 622, and the third color developing layer 623 to develop colors may be output at random intervals. The fourth times t41 and t42 may be different from the third time t3.

Others

The printer 1 is an example of the "image forming apparatus" of the present disclosure. The heat-sensitive tape M is an example of the "recording medium" of the present disclosure. The first color developing layer 621 is an example of the "first layer" of the disclosure. The second color developing layer 622 is an example of the "second layer" of the disclosure. The third color developing layer 623 is an example of the "third layer" of the disclosure. The CPU 71 is an example of the "control device" of the present disclosure. The thermal head 15 is an example of the "head" of the present disclosure.

The processes of S31, S33, S41, and S43 are an example of the "first step" of the present disclosure. The processes of S35 and S45 are an example of the "second step" of the present disclosure.

What is claimed is:

1. An image forming apparatus configured to record an image on a recording medium while conveying the recording medium, the recording medium comprising:

a first layer configured to develop a first color based on exceeding a first temperature;

a second layer configured to develop a second color based on exceeding a second temperature, the second temperature being lower than the first temperature; and a third layer configured to develop a third color based on exceeding a third temperature, the third temperature being lower than the second temperature, the first layer, the second layer, and the third layer being aligned in this order in a thickness direction, the image forming apparatus comprising:

a head configured to apply energy to the recording medium from the first layer side; and a control device configured to control the energy to be applied to the recording medium by the head so as to form an image of a mixed color of the first color, the second color, and the third color on the recording medium by controlling the head to apply the energy to the recording medium to develop the first color on the recording medium after developing the second color or the third color on the recording medium.

2. The image forming apparatus according to claim 1, wherein the control device is configured to:

form an image of only the first color on the recording medium by controlling and applying energy to the recording medium such that a time average of power supplied to the head during a first time is equal to or larger than a first average power;

form an image of only the second color on the recording medium by controlling and applying energy to the recording medium such that the time average of power supplied to the head during a second time is equal to or larger than a second average power, the second time being longer than the first time, the second average power being smaller than the first average power;

form an image of only the third color on the recording medium by controlling and applying energy to the recording medium such that the time average of power supplied to the head during a third time is equal to or larger than a third average power, the third time being longer than the second time, the third average power being smaller than the second average power; and form the image of the mixed color of the first color, the second color and the third color by controlling the time average of power supplied to the head during the first time is smaller than the first average power and by controlling the time average of power supplied to the head during the second time is equal or smaller than the second average power.

3. The image forming apparatus according to claim 2, wherein the control device is configured to form the image of the mixed color of the first color, the second color and the third color on the recording medium by controlling the time average of power supplied to the head during the first time is smaller than the first average power and by controlling the time average of power supplied to the head during the second time is smaller than the second average power.

4. The image forming apparatus according to claim 2, wherein the control device is configured to form the image of the mixed color of the first color, the second color and the third color on the recording medium by controlling the time average of power supplied to the head during the first time is smaller than the first average power and by controlling the time average of power supplied to the head during the second time is equal to the second average power.

5. The image forming apparatus according to claim 1, wherein the first color is yellow, the second color is magenta, and the third color is cyan.

6. The image forming apparatus according to claim 1, wherein the first color is yellow, the second color is cyan, and the third color is magenta.

7. An image forming method of recording an image on a recording medium while conveying the recording medium, the recording medium comprising a first layer configured to develop a first color based on exceeding a first temperature, a second layer configured to develop a second color based on exceeding a second temperature that is lower than the first temperature, and a third layer configured to develop a third color based on exceeding a third temperature that is lower than the second temperature, the first layer, the second layer, and the third layer being aligned in this order in a thickness direction, the image forming method comprising:

forming the image of the mixed color of the first color, the second color, and the third color on the recording medium by steps comprising:

a first step of developing the second color or the third color on the recording medium by applying energy to the recording medium from a head, the head being configured to apply the energy from the first layer side of the recording medium; and a second step of developing the first color on the recording medium by applying energy to the recording medium from the head after developing the second color or the third color in the first step.

8. The image forming method according to claim 7, wherein in the forming of the image, the method comprises:

forming an image of only the first color on the recording medium by controlling and applying energy to the recording medium such that a time average of power supplied to the head during a first time is equal to or larger than a first average power;

forming an image of only the second color on the recording medium by controlling and applying energy to the recording medium such that the time average of power supplied to the head during a second time is equal to or larger than a second average power, the second time being longer than the first time, the second average power being smaller than the first average power;

forming an image of only the third color on the recording medium by controlling and applying energy to the recording medium such that the time average of power supplied to the head during a third time is equal to or larger than a third average power, the third time being longer than the second time, the third average power being smaller than the second average power; and forming the image of the mixed color of the first color, the second color and the third color by controlling the time average of power supplied to the head during the first time is smaller than the first average power and by controlling the time average of power supplied to the head during the second time is equal or smaller than the second average power.

9. The image forming method according to claim 8, wherein in the forming of the image of the mixed color of the first color, the second color and the third color on the recording medium, the method comprises controlling the time average of power supplied to the head during the first time is smaller than the first average power and controlling the time average of power supplied to the head during the second time is smaller than the second average power.

10. The image forming method according to claim 8, wherein in the forming of the image of the mixed color of the first color, the second color and the third color on the recording medium, the method comprises controlling the time average of power supplied to the head during the first time is smaller than the first average power and controlling the time average of power supplied to the head during the second time is equal to the second average power.

11. A non-transitory computer-readable storage medium storing an image forming program readable by a computer of an image forming apparatus, the image forming apparatus being configured to record an image on a recording medium while conveying the recording medium, the recording medium comprising a first layer configured to develop a first color based on exceeding a first temperature, a second layer configured to develop a second color based on exceeding a second temperature that is lower than the first temperature, and a third layer configured to develop a third color based on exceeding a third temperature that is lower than the second temperature, the first layer, the second layer, and the third layer being aligned in this order in a thickness direction, the image forming program, when executed by the computer, causing the image forming apparatus to perform operations comprising:

forming the image of the mixed color of the first color, the second color, and the third color on the recording medium by steps comprising:

a first step of developing the second color or the third color on the recording medium by applying energy to the recording medium from a head, the head being configured to apply the energy from the first layer side of the recording medium; and a second step of developing the first color on the recording medium by applying energy to the recording medium from the head after developing the second color or the third color in the first step.

12. The non-transitory computer-readable storage medium according to claim 11, wherein in the forming of the image, the image forming program, when executed by the computer, causes the image forming apparatus to:

form an image of only the first color on the recording medium by controlling and applying energy to the recording medium such that a time average of power supplied to the head during a first time is equal to or larger than a first average power;

form an image of only the second color on the recording medium by controlling and applying energy to the recording medium such that the time average of power supplied to the head during a second time is equal to or larger than a second average power, the second time being longer than the first time, the second average power being smaller than the first average power;

form an image of only the third color on the recording medium by controlling and applying energy to the recording medium such that the time average of power supplied to the head during a third time is equal to or larger than a third average power, the third time being longer than the second time, the third average power being smaller than the second average power; and form the image of the mixed color of the first color, the second color and the third color by controlling the time average of power supplied to the head during the first time is smaller than the first average power and by controlling the time average of power supplied to the head during the second time is equal or smaller than the second average power.

13. The non-transitory computer-readable storage medium according to claim 12, wherein in the forming of the image, the image forming program, when executed by the computer, causes the image forming apparatus to form the image of the mixed color of the first color, the second color and the third color on the recording medium by controlling the time average of power supplied to the head during the first time is smaller than the first average power and by controlling the time average of power supplied to the head during the second time is smaller than the second average power.

14. The non-transitory computer-readable storage medium according to claim 12, wherein in the forming of the image, the image forming program, when executed by the computer, causes the image forming apparatus to form the image of the mixed color of the first color, the second color and the third color on the recording medium by controlling the time average of power supplied to the head during the first time is smaller than the first average power and by controlling the time average of power supplied to the head during the second time is equal to the second average power.

15. The non-transitory computer-readable storage medium according to claim 11, wherein the first color is yellow, the second color is magenta, and the third color is cyan.

16. The non-transitory computer-readable storage medium according to claim 11, wherein the first color is yellow, the second color is cyan, and the third color is magenta.

* * * * *